No. 784,950. PATENTED MAR. 14, 1905.
R. E. LINDSAY.
BASKET.
APPLICATION FILED JULY 6, 1904.

Witnesses
Victor L. Dodge
J. A. Hanley

Inventor
Ralph E. Lindsay

No. 784,950. Patented March 14, 1905.

UNITED STATES PATENT OFFICE.

RALPH E. LINDSAY, OF DAVENPORT, IOWA.

BASKET.

SPECIFICATION forming part of Letters Patent No. 784,950, dated March 14, 1905.

Application filed July 6, 1904. Serial No. 215,550.

*To all whom it may concern:*

Be it known that I, RALPH E. LINDSAY, a citizen of the United States, residing in Davenport, in the county of Scott and State of Iowa, have invented a new and useful Improvement in Baskets, of which the following is a specification.

My invention relates to baskets, and has for its object the production of a device of this kind which will be simple, cheap, and convenient; and it consists in the novel construction and arrangement of the parts of the basket, as will be hereinafter more fully set forth.

In carrying grain, ashes, vegetables, and other things by hand, as must frequently be done, it is necessary that a receptacle be provided of such size as to contain a sufficient quantity of the goods or product to be carried. It is necessary that the vessel be of such shape as to be brought conveniently near to the body of the person carrying it, and that the handles of the receptacle be so placed at the sides of the basket as to give the load the most staple equilibrium, and that the handles be so inclined as to afford the hand the greatest convenience in gripping them for the purposes of transportation, and, further, that the handles be so located with respect to the center of gravity of the loaded basket that a desirable poise of the basket may be maintained.

Figure 1:
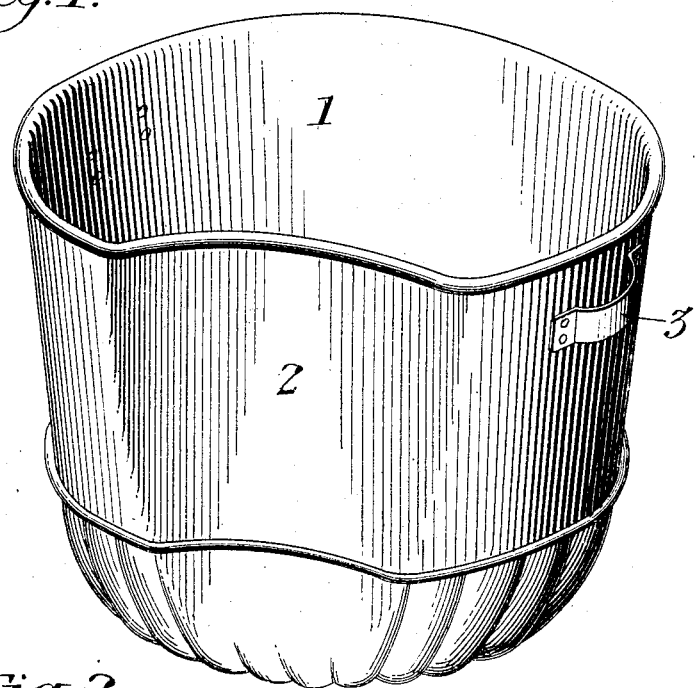
Figure 2:
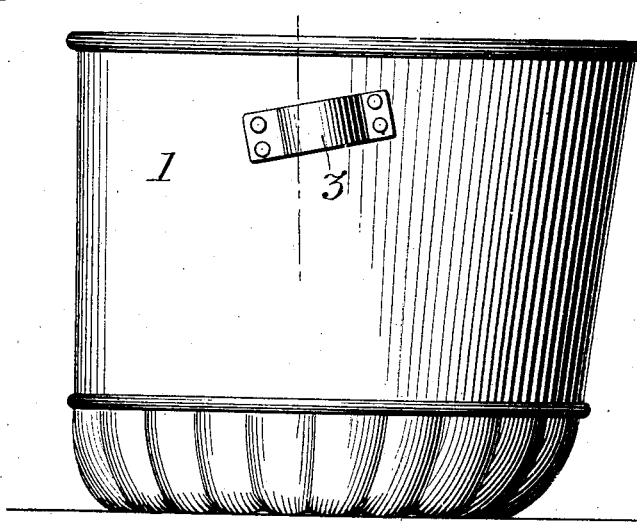

In the accompanying drawings, Figure 1 is a perspective view of one form of my basket. Fig. 2 is a vertical end view of the same.

Referring more particularly to the drawings, 1 indicates the receptacle proper, which may be formed of galvanized iron, paper, wood, or other material and may be of any suitable size—such, for example, as of one-bushel capacity.

I have changed the shape of the ordinary bushel-basket by providing in the side thereof a concaved depression or indentation extending approximately from the top to the bottom of the basket of a width of about fifteen inches at the top and tapering in toward the bottom of the basket, the general form of this concavity being such as to conform to the shape of the body—that is to say, it may be in the form of a portion of a cylinder or spheroid. The remaining portion of the side wall of the basket is preferably convexly curved up to the point of the beginning of the indentation or concavity. The handles 3 of this basket are in semicircular form and are shown as rigidly secured to the body thereof. Obviously the handles might be hingedly secured thereto. The handles are preferably inclined upwardly and forwardly, so that they are arranged at angles substantially of twenty degrees to the upper edge of the basket. The handles are placed to one side of the position commonly occupied by handles of baskets with circular tops for the purpose of affording the firmest and easiest grip in carrying the loaded basket when borne next to and resting against the body. To be more explicit as to the location of the handles, they are placed above and forward of a line passing vertically through the center of gravity of the basket when loaded. Preferably the handles should be located about half-way between the center of gravity and the rim of the loaded basket and forwardly of a vertical line passing through said center of gravity—about three-quarters of an inch on a bushel-basket. This location of the handles is obviously applicable to a two-handled basket of any shape. This location of the handles with respect to the center of gravity of the loaded basket produces a slight reaction of the burden against the body of the person, so that the arms are relieved of a portion of the burden and a more stable equilibrium of the load is obtained.

Although I have shown what I consider the most desirable form for constructing my improved basket, it is evident that changes and alterations could be made therein—as, for instance, the base could be formed by the union of the side wall straight downwardly, substituting for the ordinary rounded-basket shape the form of a truncated cone—and I reserve the right to make all such changes and alterations therein as will come within the scope of my invention.

Having thus fully described my invention, what I claim as new, and desire to secure by Letters Patent, is—

A basket having a concavity at one side, tapering downwardly from the top substantially to the bottom of the basket and having a pair of oppositely-disposed handles, symmetrically located on the basket with respect to the concavity, said handles being inclined upwardly and forwardly toward the front of the basket, at angles of substantially twenty degrees to the top of the basket, and said handles being further located so that a line joining them, will pass above and forward of the center of gravity of the basket when loaded.

<div style="text-align:right">RALPH E. LINDSAY.</div>

Witnesses:
   VICTOR L. DODGE,
   J. A. HANLEY.